US009921921B2

(12) United States Patent
Alatorre et al.

(10) Patent No.: US 9,921,921 B2
(45) Date of Patent: Mar. 20, 2018

(54) BACKUP SERVICE WITH MANAGED FILE TRANSFORMATION

(71) Applicant: International Business Machines Corporation, Armonk, NY (US)

(72) Inventors: Gabriel Alatorre, Long Beach, CA (US); Eric K. Butler, San Jose, CA (US); Thomas D. Griffin, Campbell, CA (US); Divyesh Jadav, San Jose, CA (US); Nagapramod S. Mandagere, San Jose, CA (US); Aameek Singh, University Place, WA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 14/737,705

(22) Filed: Jun. 12, 2015

(65) Prior Publication Data

US 2016/0364301 A1 Dec. 15, 2016

(51) Int. Cl.
G06F 17/30 (2006.01)
G06F 11/14 (2006.01)

(52) U.S. Cl.
CPC ...... G06F 11/1464 (2013.01); G06F 2201/84 (2013.01)

(58) Field of Classification Search
CPC ......... G06F 17/30073; G06F 17/30076; G06F 17/30377; G06F 17/3038; G06F 17/30174; G06F 17/30321; G06F 17/30339; G06F 17/30946; G06F 17/30575; G06F 17/30592; G06F 17/30312; G06F 17/30584; G06F 17/30; G06F 11/1464; G06F 2201/84; G06F 11/14
See application file for complete search history.

(56) References Cited

U.S. PATENT DOCUMENTS

| 6,629,110 | B2 | 9/2003 | Cane et al. | |
|---|---|---|---|---|
| 8,185,496 | B2 | 5/2012 | Anglin et al. | |
| 2007/0143096 | A1* | 6/2007 | Brunet | G06F 3/0605 703/23 |
| 2007/0283234 | A1* | 12/2007 | Hung | G11B 20/10 714/814 |
| 2009/0031006 | A1* | 1/2009 | Johnson | H04W 76/021 709/218 |
| 2010/0161717 | A1* | 6/2010 | Albrecht | H04L 67/2852 709/203 |

(Continued)

OTHER PUBLICATIONS

Cherkasova et al., "Run-time Performance Optimization and Job Management in a Data Protection Solution," 12th IFIP/IEEE International Symposium on Integrated Network Management, May 23-27, 2011, pp. 65-72, Copyright 2011 IEEE DOI: 10.1109/INM.2011.5990675.

(Continued)

*Primary Examiner* — Anh Ly

(74) *Attorney, Agent, or Firm* — Nicholas D. Bowman

(57) ABSTRACT

Data files can be backed up by copying, in response to a backup request, files from a client device to a backup archive and recording the status of the files. Transformed copies of files in the backup archive can be created by automatically applying a transform to the files received from the client device. Upon receiving a subsequent backup request, differences can be identified between transformed files in the backup archive and files on the client device, and in response to identified differences in the files, the transformed files can be copied back to the client device.

19 Claims, 7 Drawing Sheets

(56) References Cited

U.S. PATENT DOCUMENTS

| | | | |
|---|---|---|---|
| 2010/0257523 A1* | 10/2010 | Frank | G06F 9/45558 |
| | | | 718/1 |
| 2011/0016091 A1* | 1/2011 | Prahlad | G06F 11/1453 |
| | | | 707/654 |
| 2012/0210398 A1 | 8/2012 | Triantafillos et al. | |
| 2014/0164316 A1* | 6/2014 | Liebman | G11B 27/034 |
| | | | 707/608 |

OTHER PUBLICATIONS

Liao et al., "Partial Replication of Metadata to Achieve High Metadata Availability in Parallel File Systems," 2012 41st International Conference on Parallel Processing, Sep. 10-13, 2012, pp. 168-177, Pittsburgh, PA, Copyright 2012 IEEE DOI: 10.1109/ICPP.2012.49.

Morton et al., "Hierarchical File System Usage Guide," IBM Redbooks, Chapter 5, pp. 123-152, Sep. 2000, © Copyright IBM Corp. 1999, 2000.

SPI DST et al., "Improving Information Storage Reliability Using a Data Network," An ip.com Prior Art Database Technical Disclosure, Original Publication Date Oct. 31, 1976, ip.com Electronic Publication Mar. 30, 2007 ip.com No. IPCOM000149054D, 136 pages.

Mell et al., "The NIST Definition of Cloud Computing," National Institute of Standards and Technology, U.S. Department of Commerce, Special Publication 800-145, Sep. 2011, 7 pages.

* cited by examiner

BACKUP SERVICE WITH MANAGED FILE TRANSFORMATION

BACKGROUND

The present disclosure generally relates to backing up files on an electronic system. In particular, this disclosure relates to enhancing, through transforming, copies of files that are backed up, and managing the transforming and updating of the backed up files.

A process of backing up electronically stored data files can include the copying and/or archiving of data files stored on a computer or other electronic system, so the files may be restored to the electronic system after a data loss event. In certain applications, data backups may be regularly scheduled and/or automated, and may be supplemented by manually initiated backups.

SUMMARY

Various aspects of the present disclosure may be useful for enhancing the content of backed up files through the automated application of file transforms to the backed up files. A file backup and recovery service configured according to embodiments of the present disclosure may automatically apply reversible transforms or enhancements to, and/or create metadata for, compressed and media files without the need for manual application of new and/or improved file transforms.

Embodiments may be directed towards a method for backing up data files. The method includes receiving a first request to back up a first set of files from a client device to a backup archive and copying, to the backup archive, and recording a file status of, in response to the first request, a first instance of at least one file from the first set of files. The method also includes creating, in the backup archive, and recording the file status of, at least one transformed file that includes a second instance of the at least one file, by applying at least one transform selected from a set of transforms to the first instance of the at least one file. The method also includes receiving a second request to back up, from the client device to the backup archive, a second set of files and identifying, in response to the second request, the at least one transformed file with an instance in the backup archive that has a different file status than an instance of the at least one transformed file in the client device. The method also includes sending, in response to the identifying, the at least one transformed file to the client device and replacing, in the client device, the first instance of the at least one transformed file with the second instance of the at least one transformed file, and recording the file status of the least one transformed file.

Embodiments may also be directed towards a computer program product for backing up files from a client device to a backup archive. The computer program product includes at least one computer readable storage medium containing program instructions, where the at least one computer readable storage medium is not a transitory signal per se. The program instructions may be executable by at least one computer processor circuit to cause the at least one computer processor circuit to perform a method. The method includes receiving a first request to back up a first set of files from a client device to a backup archive and copying, to the backup archive, and recording a file status of, in response to the first request, a first instance of at least one file from the first set of files. The method also includes creating, in the backup archive, and recording the file status of, at least one transformed file that includes a second instance of the at least one file, by applying at least one transform selected from a set of transforms to the first instance of the at least one file. The method also includes receiving a second request to back up, from the client device to the backup archive, a second set of files and identifying, in response to the second request, the at least one transformed file with an instance in the backup archive that has a different file status than an instance of the at least one transformed file in the client device. The method also includes sending, in response to the identifying, the at least one transformed file to the client device and replacing, in the client device, the first instance of the at least one transformed file with the second instance of the at least one transformed file, and recording the file status of the least one transformed file.

Embodiments may also be directed towards an electronic system for backing up files from a client device to a backup archive. The electronic system may include a memory and at least one processor in communication with the memory. The electronic system may be configured to perform a method that includes receiving a first request to back up a first set of files from a client device to a backup archive and copying, to the backup archive, and recording a file status of, in response to the first request, a first instance of at least one file from the first set of files. The method also includes creating, in the backup archive, and recording the file status of, at least one transformed file that includes a second instance of the at least one file, by applying at least one transform selected from a set of transforms to the first instance of the at least one file. The method also includes receiving a second request to back up, from the client device to the backup archive, a second set of files and identifying, in response to the second request, the at least one transformed file with an instance in the backup archive that has a different file status than an instance of the at least one transformed file in the client device. The method also includes sending, in response to the identifying, the at least one transformed file to the client device and replacing, in the client device, the first instance of the at least one transformed file with the second instance of the at least one transformed file, and recording the file status of the least one transformed file.

Aspects of the various embodiments may be useful in providing differentiation between backup service providers by streamlining, through compression, and automatically appending valuable data/metadata to backed up client files, without the use of client hardware resources. Aspects of the various embodiments may also be useful for providing file enhancements that are removable in order to allow restoration of the original, backed up files for the possible application of new and/or improved file transforms.

Aspects of the various embodiments may also be useful for providing cost-effective file enhancement capability for use with backup service providers, by using existing and proven file enhancement, data mining and file annotation technologies.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
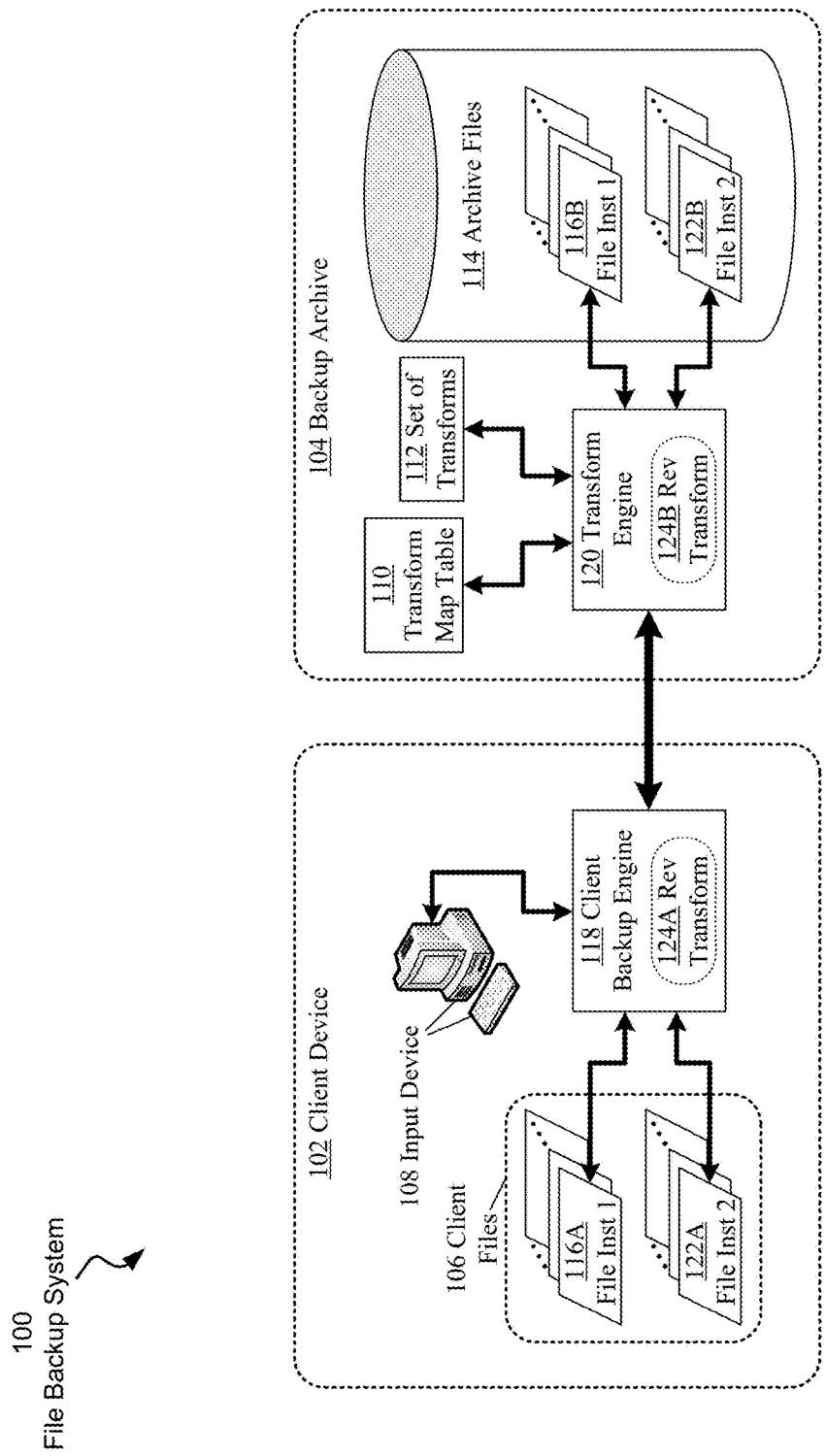
FIG. 1 is a block diagram depicting a file backup system including a client device and a backup archive, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

The present disclosure may be an electronic system, a method, and/or a computer program product for executing the method. The computer program product may include a computer readable storage medium or media having computer readable program instructions thereon for causing a processor to carry out aspects of the present invention.

Certain embodiments of the present disclosure can be appreciated in the context of applying file transforms such as file compression to files to be backed up from a client device such as a personal computer, mainframe computer, server or mobile electronic device. File compression may be used to reduce the size of data files, while preserving the original content of the files. File compression algorithms can include, but are not limited to algorithms for compression of audio, video, text and executable files. Compressed files may be useful for reducing the storage space utilized to contain backed up files. While not necessarily limited thereto, embodiments discussed in this context can facilitate an understanding of various aspects of the disclosure. Certain embodiments may also be directed towards other equipment and associated applications, such as applying file transforms that include generating and appending metadata to files backed up from a client device. Metadata generation algorithms can include, but are not limited to algorithms designed to recognize and "transcribe" voices, text contained within still or video images, and names and/or characteristics of other types of recognizable objects.

Providing enhanced data/metadata to archive files such as audio, video and executable files, may be useful to a wide variety of user, content searching and data processing applications. Such applications may run on systems including, but not limited to, personal computers, servers, supercomputers, high-performance computing (HPC) systems, and other types of special-purpose computers. Embodiments may also be directed towards applying other types of file transforms to backed up data files to facilitate removal of viruses and malware, and the execution of file version maintenance operations.

For ease of discussion, the term "transformed" may be used herein, as applied to modifications made to backed up files, however, it is understood that the result of the application of file transforms may lead to "improved" files. Transforms applied to files may, for example, yield files having a reduced size or increased/enhanced data or metadata associated with the original file, which may be viewed by clients as improvements over the instances of the files that were transformed.

A backup and restore system may be designed to efficiently and accurately preserve copies of client files, and make them available for restoration, in the event of file loss or corruption. Such a system may preserve one or more versions of a client's files, e.g., different backup copies created on different dates. Such a system, however, may not be configured to enhance or improve backed up client files, and may simply make available identical copies of the original files for restoration.

Certain types of backed up client files may be enhanced through the automatic application of file transforms. File transforms may be useful for example, in compressing or updating certain types of files, or appending relevant and useful data or metadata to the files. Users of automatic backup systems may find automatically applied file transforms useful in eliminating manual interaction with, intervention in, and management of the file transformation process. Users may also benefit from execution of the file transformation process without the need for user-supplied hardware/system resources such as processor time, system memory capacity, and network bandwidth. In addition, with such a backup system, users may not have to track versions of transformed files, and may benefit from "reversible" transforms which allow the user to revert back to an original file backed up from a client device. A backup and restore system may also be configured to automatically update backed up files with new and/or improved transform versions in a process that is transparent to system users. Backup service providers may find a backup system that automatically applies file transforms to client files useful in differentiating their service from other, competing backup services.

Various embodiments of the present disclosure relate to a file backup service configured to perform automated file backup and enhancement without requiring input from backup service users. Streamlined, e.g., compressed, and enhanced archive files may result from the use of an enhanced file backup service. The file backup service may also increase user backup/restore options by providing the backup service user with multiple choices of enhanced or original file versions to use on, or restore to, a client device.

A backup service configured according to certain embodiments may be compatible with existing and proven file servers and/or network-based backup solutions, and may be a useful and cost-effective way to provide valuable file enhancements and transforms, including compression, to the backup service.

Certain embodiments relate to a system configured to apply file transforms to files during a backup process. FIG. 1 is a block diagram depicting a file backup system 100 including a client device 102 and a backup archive 104, according to embodiments of the present disclosure.

In certain embodiments, the client device 102 may be a portable electronic device such as a tablet device, cell phone or personal digital assistant (PDA). In certain embodiments, the client device 102 may be a computer system such as a personal computer (PC), mainframe computer or server. In embodiments, client device 102 can include and make use of client files 106. In order to ensure continuity of operation of client device 102 and prevent loss of valuable data contained in client files 106, client files 106 may be periodically backed up.

Backup archive 104 may, in certain embodiments, be contained within a centralized file/backup server or service. In particular embodiments, backup archive 104 may be a cloud backup device or service, and may be centralized in certain embodiments or distributed in certain embodiments. Backup archive 104 may be useful, when connected to client device 102, as a repository for backing up client files 106 of client device 102. In embodiments, backup archive 104 may also be used to apply file transforms to client files 106 after client files 106 are backed up onto backup archive 104. In embodiments, backup archive 104 may be connected to client device 102 through a variety of interconnection schemes such as a local-area network (LAN), wide-area network (WAN), through the Internet or in a cloud-based configuration.

Client device 102 can include client files 106, input device 108 and client backup engine 118. Client backup engine 118 may be, in embodiments, software useful for backing up client files 106 to backup archive 104. In certain embodiments, backup operations carried out by client backup engine 118 may be regularly scheduled and/or automated, and in certain embodiments backup operations may be initiated in response to user input, e.g., commands, received through input device 108. Client backup engine 118 may respond to user commands received from input device 108, and may also send status messages back to input device 108. Status messages may be useful to inform a client or user of the status of particular files, which can include, for example, transforms that have been applied to the files, and versions of the files which are currently available for use by the client device 102.

According to embodiments, reverse transform 124A of client backup engine 118 may be useful for applying a reverse transform to previously transformed file instance 122A in order to re-generate a copy of the original, non-transformed file instance 116A. In certain embodiments, applying a reverse transform to a transformed file instance 122A may be in response to user command received by input device 108. In certain embodiments, client backup engine 118 may be useful in replacing file instance 116A with file instance 122A within client device 102, in response to receiving a "file replacement request" or command from a user. In certain embodiments, messages to a system user may be received by client backup engine 118 from backup archive 104, and subsequently displayed on input device 108. In certain embodiments such messages may be useful to indicate to a client or user that at least one transformed file has been copied from the backup archive 104 to the client device 102.

In embodiments, input device 108 may be a device such as a keyboard or touchscreen device and can also include a display device such as a monitor or touchscreen. In certain embodiments, input device 108 may be integral to client device 102, and in certain embodiments input device 108 may be attached, for example, to client device 102 through one or more cables, a wireless or a network interface.

Client files 106 can include a file instance 116A and a file instance 122A. According to embodiments, file instance 116A can include "original" instance(s) of one or more particular files, while file instance 122A can include "transformed", e.g., modified or updated, instance(s) of the same one or more particular files.

In certain embodiments, backup archive 104 includes archive files 114, transform engine 120, set of transforms 112 and transform map table 110. Archive files 114 can include file instance 116B and file instance 122B. In embodiments, transform engine 120 may interact with transform map table 110 and set of transforms 112, and may also include reverse transform(s) 124B. For example, transform engine 120 may read the original file instance 116B, select and retrieve a particular transform(s) from set of transforms 112, by using transform map table 110, apply the selected transform(s) to file instance 116B and then subsequently write out the transformed file instance 122B.

In embodiments, backup archive 104 maintains a set of file transform capabilities, i.e., transforms, by adding new transforms to a set of transforms 112 and by adding file and transform correspondence information that indicates transforms appropriate for various file types, to transform map table 110. Transform map table 110 can be used in the selection, from the set of transforms, of at least one transform to apply to files received from client device 102.

In particular embodiments, transform map table 110 can include content consistent with that included in Table 1, below. According to embodiments, the set of transforms 112 can include, but is not limited to transforms such as executable programs and file filters. In certain embodiments, transform engine 120 may pass an unaltered copy of a file backed up from client device 102 to the backup archive 104, and in certain embodiments, transform engine 120 may apply one or more transforms, using transform map table 110 and set of transforms 112, before writing a transformed copy of a file received from client device 102 to archive files 114. In certain embodiments, transform engine 120 may be capable of performing multiple types of files transforms for a particular file type. For example, a variety of transforms involving various levels of data compression and/or metadata extraction from an original file may be available.

Table 1, below, includes a listing of Original File Types, prior to the application of any file transforms, and corresponding Transform Types which may be applied to the listed Original File Types. For example, any of the Original File Types including audio, still image, video, text or executable may have a lossy or lossless file compression Transform Type, such as ZIP, 7-Zip, RAR, deflate applied to them. The column labeled Transformed File Type indicates the corresponding file type or suffix after the application of the listed transformation type(s). The column labeled Possible Metadata Added indicates what types of metadata may be added to particular file types, depending on a particular transformation type. Metadata can include, for example, captions, image summarization, or various types of data extracted from the original file, which may be useful to a user.

Table 1 includes various examples of original File Types, Transform Types, Transformed File Types, and Possible Metadata Added, however, this is not limiting in any way; additional instances of each of these categories may be included within a transform map table 110 and a set of transforms 112, according to embodiments of the present disclosure. File Transform Types may include, by way of example, executable programs and file filters, however, other file transform types may be included in particular embodiments of the present disclosure.

TABLE 1

File Transform and Metadata Types

| Original File Type | Transform Type | Transformed File Type | Possible Metadata Added |
|---|---|---|---|
| Audio, still image, video, text, executable | File compression or optimized compression (ZIP, 7-Zip, RAR) | .zip, .7z, .rar, tar.gz, etc. | |
| Still image | optimized (re)compression | Still image | |
| Video | Voice recognition | Video | Captions (text transcript) |
| Video, still image | Optical character recognition (OCR) | Video, still image | ASCII text of on-screen text in images (e.g., credits, captions) |
| Video, still image | Optical character recognition (OCR) | Video, still image | License plate numbers/ associated data |
| Video, still image | Crowd-sourced or automated recognition | Video, still image | Summarization into key scene frames |
| Video, still image | Crowd-sourced or automated recognition | Video, still image | Textual summarization of video clip or image |
| Video, still image | Facial detection/recognition from biometric database | Video, still image | Names or ids of recognized faces |
| Video, still image | Automobile recognition | Video, still image | Car make, model, color |
| Executable (.exe) | Remove viruses and malware, update version of .exe | Executable (.exe) | |
| Executable (.exe) | Software version and dependent files management | Executable (.exe) | |
| Video, still image | Location recognition | Video, still image | Geographical info; longitude, latitude, landmarks, address, or location data |
| Video, still image | Crowd-sourced or automated object recognition | Video, still image | Names of recognized objects, i.e., car, house, road, etc. |
| Video, still image | Chemical recognition (OCR) | Video, still image | Chemical symbols, e.g., SMILES or MOL format |
| Audio | Voice recognition | Audio | Text transcript |
| Audio | Music recognition | Audio | Track title, artist info, cover art |

In certain embodiments, transforms may make use of various resources such as software programs or modules and/or data repositories which may be accessed by the software. Such resources may be available locally, for example, on the backup system or on a LAN, or may be accessible through a WAN, the Internet, or a cloud-based configuration. Data repositories may include, for example databases or libraries of images and biometric data. Software resources may include, for example, file or image search or comparison software, optical character recognition software and crowdsourcing applications. Crowdsourcing applications may include obtaining services, ideas, or content, such as metadata, by soliciting contributions from a group of people, for example, an online community. Crowdsourcing applications may be particularly useful, for example, in the recognition of image content including objects, locations, faces or other image features which may be difficult to recognize through the use of automated image recognition software.

Figure 2:
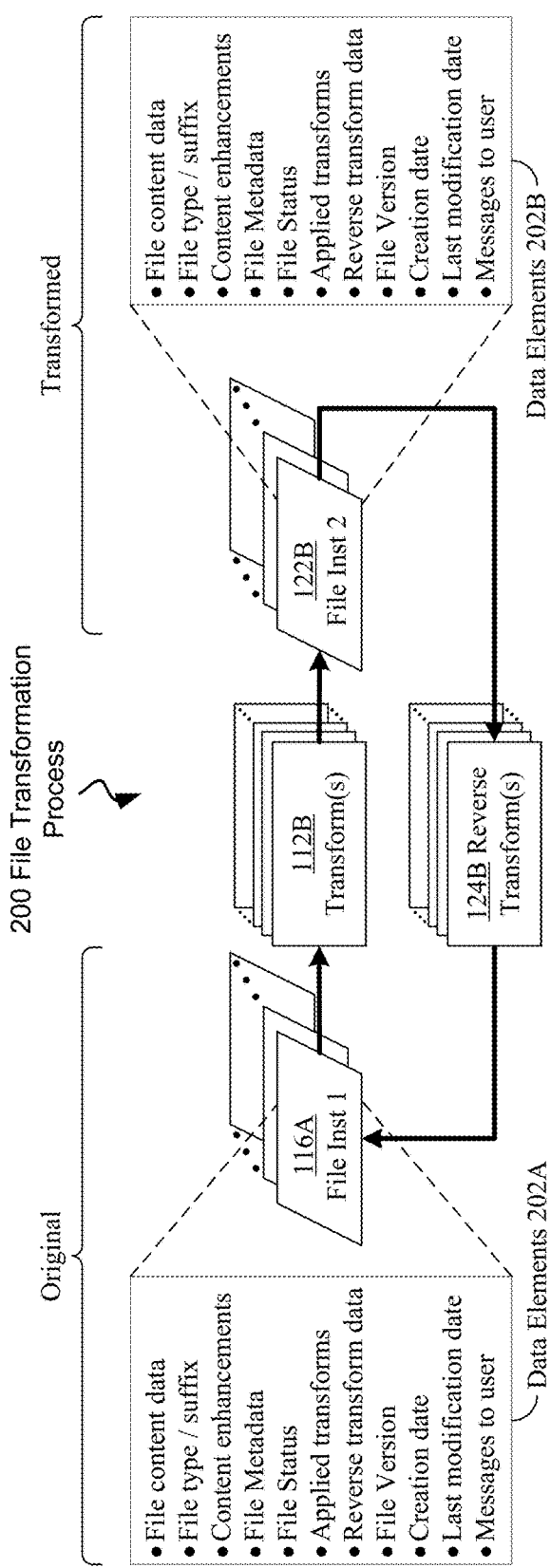
FIG. 2 is a block diagram depicting a file transformation process, according to embodiments consistent with FIG. 1.

FIG. 2 is a block diagram depicting a file transformation process 200, according to embodiments consistent with FIG. 1. File instance 116A, which may be an original file that has not previously had a file transform applied to it, may be transformed by the application of transform(s) 112B, resulting in a transformed file instance 122B. Similarly, the transformed file instance 122B may have a reverse transform(s) 124B applied to it, which may result in the re-generation of a file instance 116A. In embodiments, both file instance 116A and file instance 122B may each represent one or more file(s). In embodiments, transform(s) 112B and reverse transform(s) 124B may each represent one or more transform(s) and reverse transform(s).

In embodiments, file instance 116A can include various combinations of the data elements 202A. Data elements 202A and data elements 202B may include any of the elements listed in FIG. 2. The "File content data" data element may include the main content of a file, for example text, audio data or video data. The "File type/suffix" data element may indicate the type of file, for example, ".exe" for an executable file, or ".txt" for a text file. The "Content enhancements" and "file metadata" data elements may include data in addition to the "file content data", which may be useful to users. Table 1, above, lists several types of "Content enhancements" and "File metadata" data elements.

The "File status" data element may include various indicators such as: "backed up", "transformed copy ready", "transformed copy used", and "file in use", which are useful to indicate backup, transformation, location and use information/status pertinent to particular file. In certain embodiments, a file backup system can record the applied transform(s) and/or reverse transform(s) within data elements 202A and/or data elements 202B. In particular embodiments, the file backup system can record the transform(s) and/or reverse transform(s) applied to various file(s) in a common location, such as a data file or database.

The "Applied transforms" data element may be used to indicate one or more transforms which have been applied to an "original", i.e., not transformed, file, e.g., 116A. The "Reverse transform data" data element may similarly be used to indicate reverse transforms which have been applied to a file that has previously had transforms applied to it.

The "File version" data element may be used to indicate a particular version of a file and/or program to be used that corresponds to the file. "Creation date" and "last modification date" data elements may be used to indicate when a file was first created and last modified, respectively. The "Messages to user" data element may be used to contain information to be sent to a client device that indicates the status of, or other information pertinent to, one or more files.

In embodiments, data elements 202A and data elements 202B, corresponding to file instance 116A and file instance 122B respectively, may have different values. For example the "file content data" of data elements 202A may be changed through the application of one or more of the transform(s) 112B, so that the "file content data" of file instance 122B is different than that of file instance 116A. Similarly, any of the other data elements may be different, as the result of the application of transform(s) 112B and/or reverse transform(s) 124B, between file instance 116A and file instance 122B.

The discussion of data elements 202A and data elements 202B and file status indicators herein is not limiting in any way; other data elements and file status indicators not listed or described may be used in conjunction with certain embodiments. In embodiments, through the process of application of transform(s) 112B and reverse transform(s) 124B, file instance 116A may be replaced by a reverse-transformed copy of file instance 122B.

In certain embodiments, a previously backed up and transformed file can be subsequently modified. The file backup system can recognize, through data contained in data elements 202A and data elements 202B, previously applied transforms, reverse these applied transforms, and subsequently re-apply updated or improved transforms to the original file.

Figure 3:
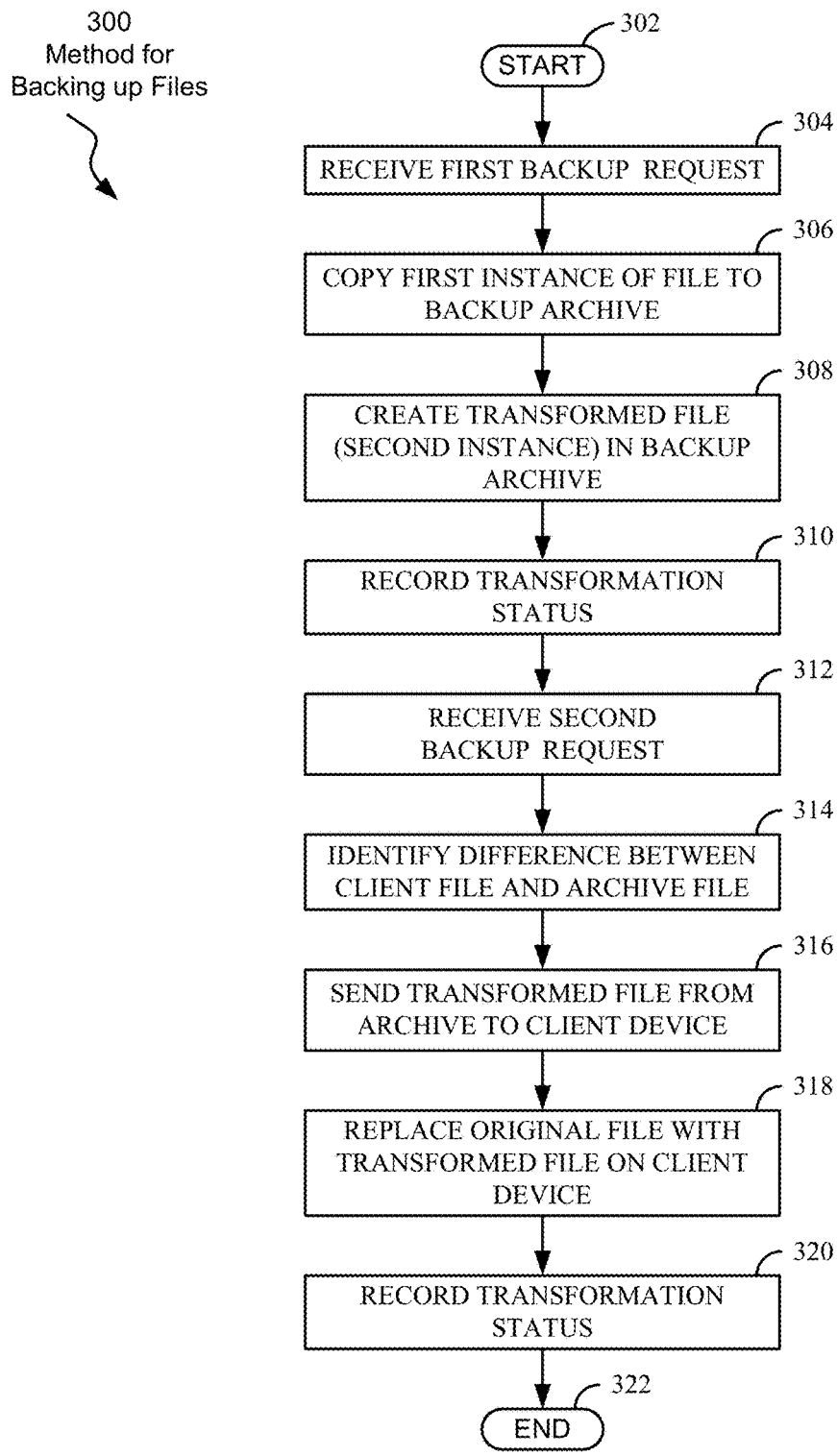
FIG. 3 is a flow diagram illustrating a method for backing up files, according to embodiments consistent with the figures.

FIG. 3 is a flow diagram illustrating a method for backing up files 300, according to embodiments consistent with the figures. The process 300 moves from start 302 to operation 304. Operation 304 generally refers to receiving a backup request. In embodiments, the backup request can come from a client or user, or from a regularly scheduled backup request, i.e., a software module, or from software that monitors file movement and/or change activity. The backup request may specify that a set of files be backed up from a client device to a backup archive. Once a backup request is received, the process moves to operation 306.

Operation 306 generally refers to copying an instance of at least one file to a backup archive. Operation 306 is initiated by the request received in operation 304. Following the successful completion of the copy/backup operation, the file status of successfully copied file(s) may be recorded as "backed up". Once the file is backed up, the process moves to operation 308.

Operation 308 generally refers to creating a transformed copy of the backed up file within the backup archive. Creating a transformed copy of a file is done by applying a file transform such as a file filter or executable to the backed up file. A file transform may be selected through the use of a transform map table, which may contain correspondence information between a set of transforms and file types that the transforms may be applied to. In certain embodiments, transforms are applied to recently backed up files within a backup archive. In certain embodiments, transforms can be applied to files within the backup archive that were backed up at an earlier time. Once a transformed copy of the file is created, the process moves to operation 310.

Operation 310 generally refers to recording transformation status of the transformed file(s). In embodiments, once the transformed copy of the file(s) has been created and is ready for use, the file status may be updated from "backed up" to "transformed copy ready". Once the transformation status of the transformed file(s) is recorded, the process moves to operation 312.

Operation 312 generally refers to receiving a subsequent request for backing up files from a client device to a backup archive. The backup request received in operation 312 may be consistent with the backup request received in operation 304, however in embodiments, the set of files for which backup is requested in operation 312 may be different than the set of files for which backup was requested in operation 304. Once the subsequent backup request is received, the process moves to operation 314.

Operation 314 generally refers to identifying differences between a file located in a client device and a corresponding copy of the file located in a backup archive. In embodiments, a file comparison program may be used to identify differences between files. In embodiments, operation 314 may be initiated by the backup request of operation 312. In certain embodiments, identified differences in instances/copies of a file may include differences in the recorded status of the file instances/copies. Once file differences have been identified, the process moves to operation 316.

Operation 316 generally refers to sending a copy/instance of a transformed file from a backup archive to a client device. In embodiments, operation 316 may be initiated in response to file differences identified in operation 314. In certain embodiments, after a copy/instance has been copied to the client device, a message may be sent to notify a client that a copy of a transformed file is available for use. In embodiments, this user notification may correspond to the completion of a backup cycle. In certain embodiments the transformed file instance may be sent "in full", and in certain embodiments, just a "delta patch" is sent to the client device, along with instructions to the client regarding how to update the original copy to the transformed version. The "delta patch" may be a relatively small file that describes the changes to apply to the original instance of a file in order to create a transformed instance of the original file. Once the transformed file is copied to the client device, the process moves to operation 318.

Operation 318 generally refers to replacing the original file on the client device with a transformed file on the client device. In certain embodiments, the client may choose to replace the original file on the client device with the transformed version of the file, by entering commands through a user input device such as a PC, terminal, tablet or other electronic device. Once the original copy of the file is replaced with the transformed copy of the file, the process moves to operation 320.

Operation 320 generally refers to recording the transformation status of the file. In embodiments, after the original file on the client device is replaced by the transformed copy of the file, the file status is changed to "transformed copy used". Once the transformation status is recorded, the process 300 may end at block 322.

Figure 4:
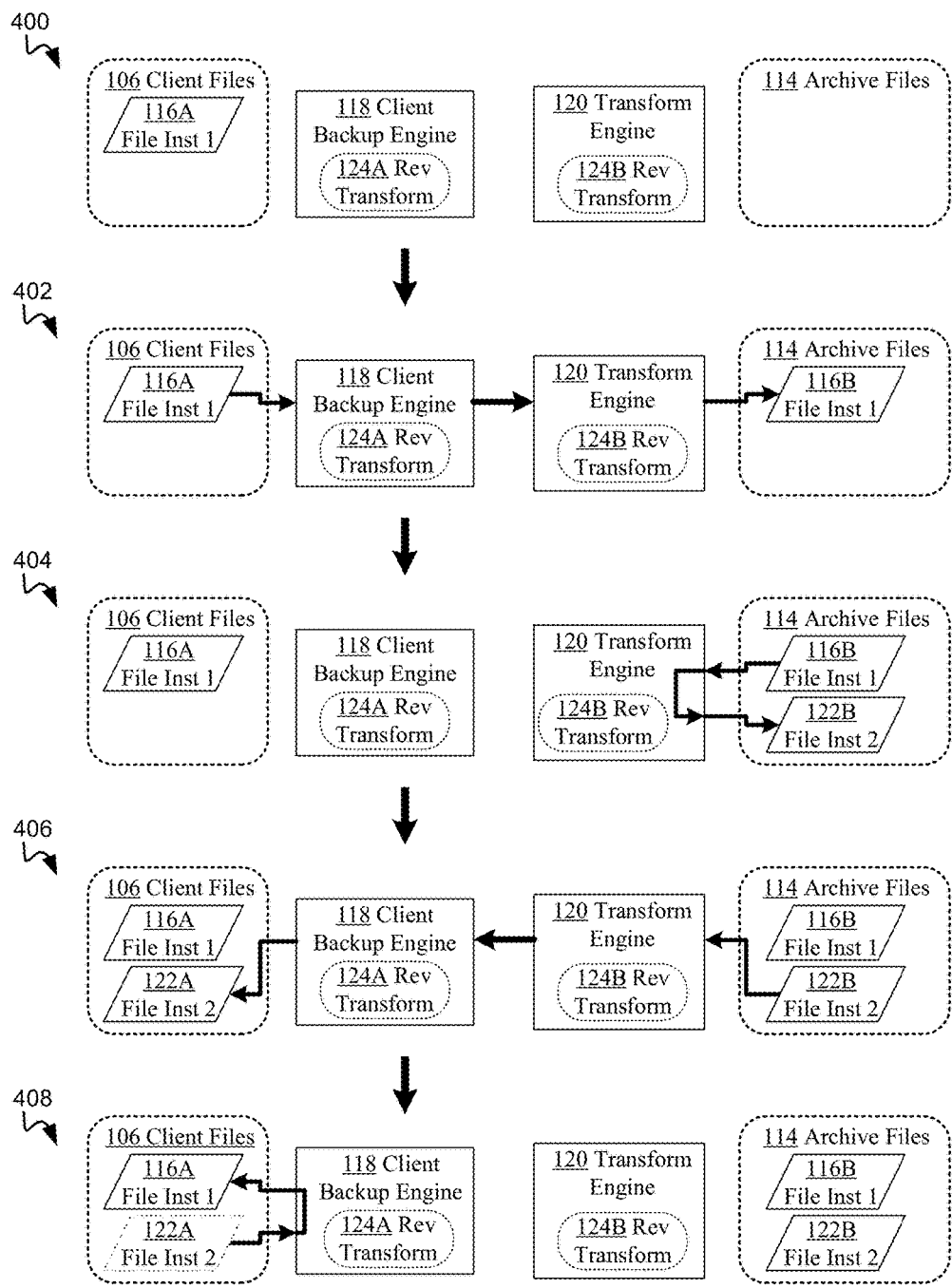
FIG. 4 includes five block diagram views illustrating operations involved in backing up, transforming and restoring transformed files, according to embodiments consistent with the figures.

FIG. 4 includes five block diagram views 400-408 illustrating a sequence of operations involved in backing up, transforming and restoring transformed files, according to embodiments consistent with the figures. The sequence of operations depicted in views 400-408 represent, by way of example, a particular order of a set of file operations, which may be useful in backing up, transforming and restoring a set of transformed files according to embodiments. The order of these operations however is not limiting in any way; certain embodiments may incorporate operations or sequences of operations which may vary from the particular sequence depicted.

View 400 depicts files and software that can be involved in a file backup process, consistent with FIG. 1 and FIG. 2, before backup or file transformation activity occurs. A client device can include an original file instance 116A within a set of client files 106, and client backup engine 118 which includes reverse transform 124A. A backup archive can include a set of archive files 114 and a transform engine 120 which includes a reverse transform(s) 124B. In certain embodiments, archive files 114 may include previously backed up copies of files.

View 402 depicts the operation of copying file instance 116A from client files 106 to file instance 116B within archive files 114. The copying operation may be initiated by a request to back up a set of files from the client device to the backup archive. Client backup engine 118 can be used to copy file instance 116A to transform engine 120, which can create file instance 116B within archive files 114. Transform engine 120 can also record a "backed up" file status of file instance 116B. Once file instance 116A is copied to archive files 114, the sequence may continue with the operation depicted in view 404.

View 404 depicts using transform engine 120 to create transformed file instance 122B from original file instance 116B. Transform engine 120 may use a transform from a set of transforms to apply to file instance 116B to create file instance 122B. A transform map table may be used by transform engine 120 in order to select a transform that is appropriate for file instance 116B. After transformed file instance 122B is created within archive files 114, a file status of "transformed copy ready" of file instance 122B may be recorded by transform engine 120. Once file instance 122B has been created, the sequence may continue with the operation depicted in view 406.

View 406 depicts the results of identifying, in response to a subsequent backup request, a file instance 122B with an instance in the archive files 114 having a different file status than an instance of the transformed file within the client files 106. In response to this identifying, file instance 122B is sent from archive files 114 to file instance 122A within client files 106. In certain embodiments, a user message is included with file instance 122A that can be used to inform a client that a new version of the file exists. The file instance 122B can be sent in full, or just a "delta patch" can be sent to the client files 106. In embodiments, a message can be sent to inform the client that the local copy file instance 116A can be updated by using the transformed or improved file instance 122A. Once the transformed file instance 122B is copied to file instance 122A, the sequence may continue with the operation depicted in view 408.

View 408 depicts updating a copy of a client file instance 116A with a transformed copy of a backed up file instance 122A that has been copied from archive files 114. In embodiments, an original instance of a file instance 116A may be replaced by a transformed file instance 122A of the file, in response to user input. In certain embodiments, the file replacement may be automated, and may occur in response to a transformed file, within the client device, having a "transformed copy ready" status. In certain embodiments, file updating occurs in response to user input, for example through an input device 108 or terminal. In certain embodiments, reverse transform 124A within client backup engine 118 may be useful to apply a reverse transform in order to generate a file instance 116A from a file instance 122A. In embodiments, application of a reverse transform may be initiated in response to a user command. In particular embodiments, the status of the file may be changed to "transformed copy used" following the operation depicted in view 408. Once the copy of the client file has been updated or replaced, the sequence depicted in FIG. 4 may be completed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
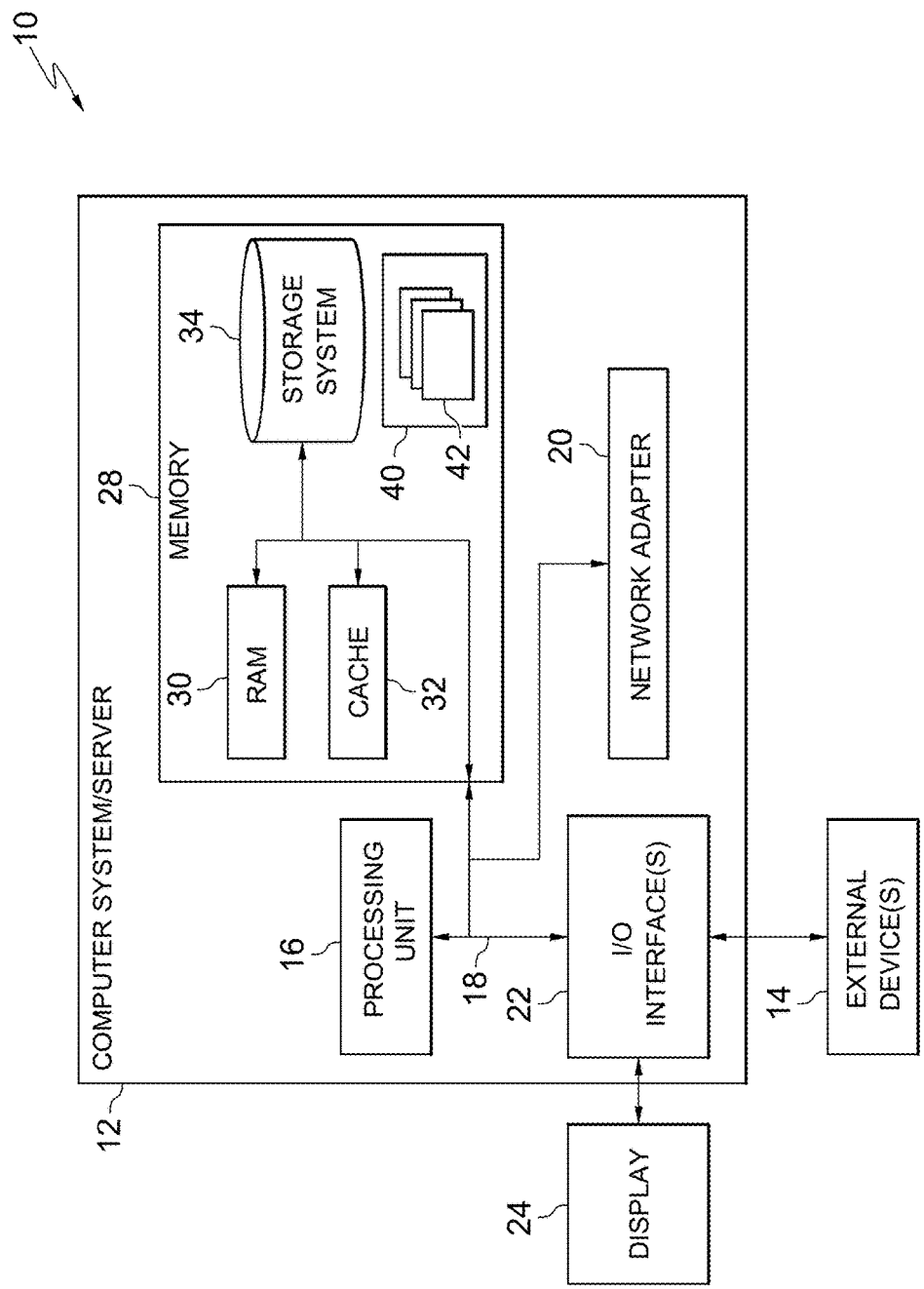
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
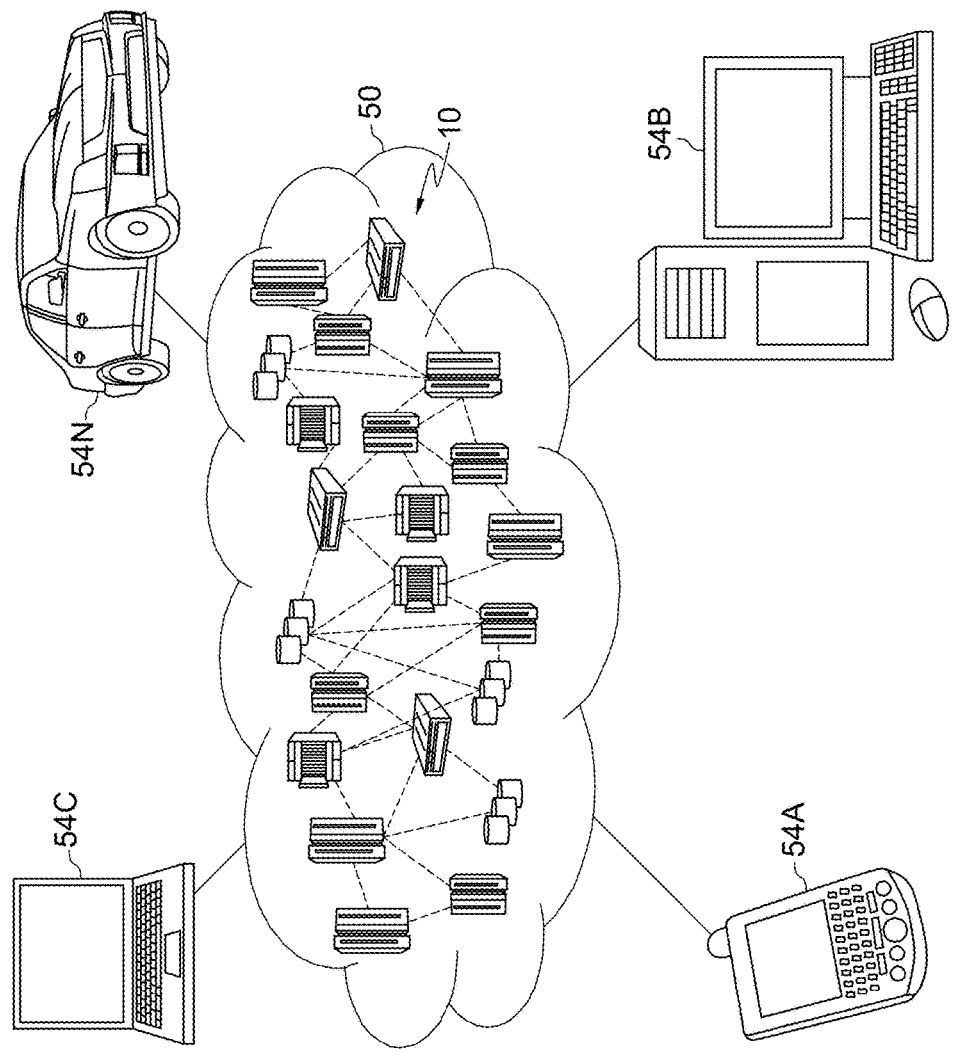
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
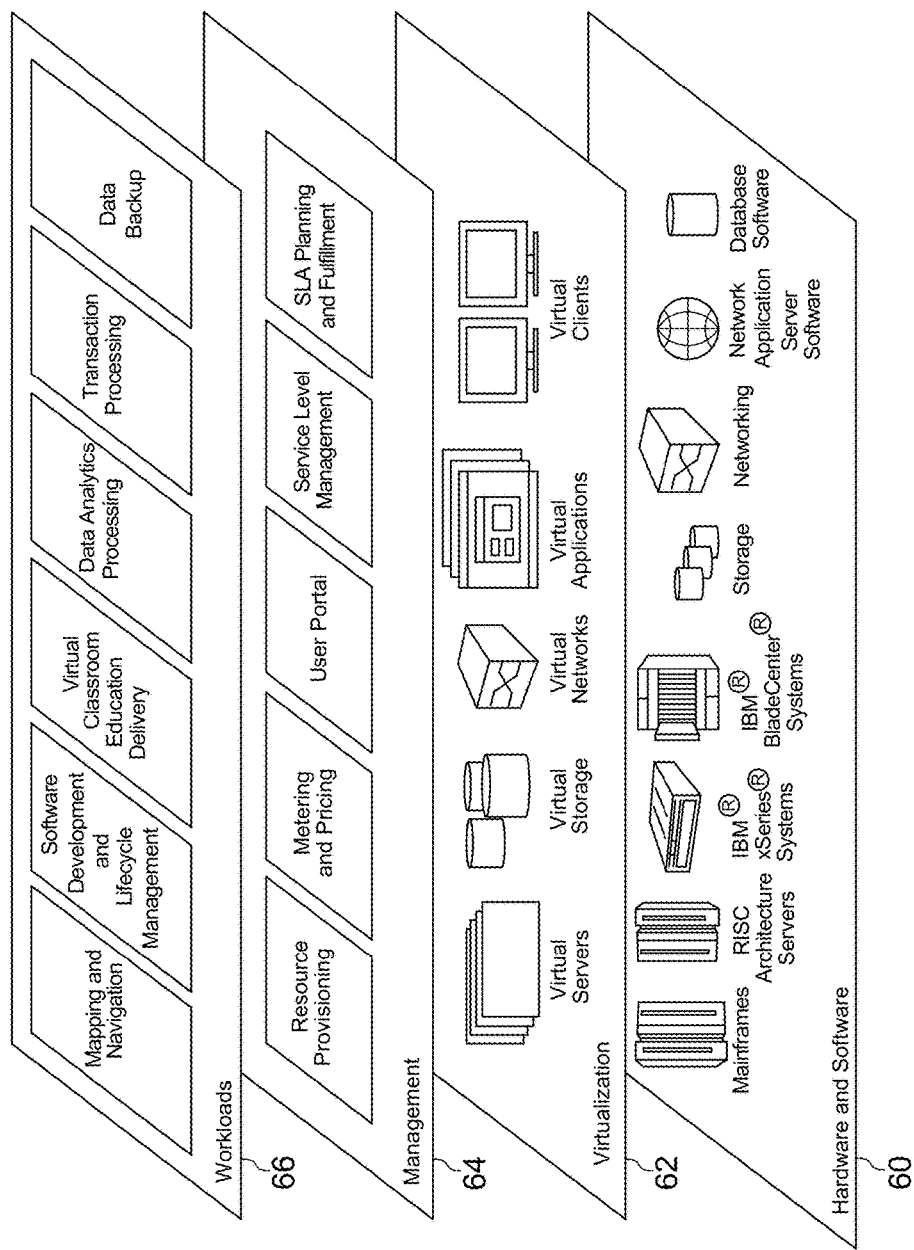
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data backup.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for backing up electronically stored data files from a client device to a backup archive communicatively coupled to the client device, the method executed on at least one computer processor circuit in communication with a memory, the at least one computer processor circuit configured to obtain instructions from the memory that cause the at least one computer processor circuit to execute the method, the method comprising:
   receiving a first request to back up a first set of data files from a client device to a backup archive;
   copying, in response to the first request, with a client backup engine, to the backup archive, and recording, with a transform engine, a file transformation status of an original instance of an at least one data file from the first set of data files;
   creating and recording the file transformation status of, with the transform engine in conjunction with a set of transforms and a transform map table, in the backup archive, an at least one transformed data file that includes a transformed instance of the at least one data file, by applying an at least one transform, selected from the set of transforms in accordance with the transform map table, to the original instance of the at least one data file;
   receiving a second request to back up, from the client device to the backup archive, a second set of data files;
   identifying, with a data file comparison program, in response to the second request, the at least one transformed data file with an instance in the backup archive that has a different file transformation status than an instance of the at least one transformed data file in the client device; and
   sending, with the transform engine, in response to the identifying, the at least one transformed data file from the backup archive to the client device.

2. The method of claim 1, further comprising maintaining the set of transforms by adding at least one additional transform to the set of transforms and by adding corresponding data file and transform mapping information to the transform map table.

3. The method of claim 1, wherein the set of transforms includes at least one transform from a group consisting of: executable programs and data file filters.

4. The method of claim 2, wherein the transform map table is used in a selection, from the set of transforms, of the at least one transform to apply to the original instance of the at least one data file.

5. The method of claim 1, further comprising, in conjunction with copying, to the backup archive, the original instance of at least one data file from the first set of data files, recording the file transformation status of the at least one data file to indicate that the original instance of at least one data file is backed up.

6. The method of claim 1, further comprising, in conjunction with creating in the backup archive at least one transformed data file that includes a transformed instance of the at least one data file, recording the file transformation status of the at least one transformed data file to indicate that a transformed copy is ready.

7. The method of claim 1, wherein the set of transforms includes at least one transform configured to perform lossless Roshal Archive (RAR) file compression.

8. The method of claim 1, wherein the set of transforms includes at least one transform configured to perform lossless ZIP file compression.

9. The method of claim 1, wherein the creating and recording the file transformation status of the at least one transformed data file, by applying the at least one transform to the original instance of the at least one data file includes selecting, from the set of transforms, a transform configured to append metadata to the original instance of the at least one data file.

10. The method of claim 1, wherein the creating and recording the file transformation status of the at least one transformed data file, by applying the at least one transform to the original instance of the at least one data file includes selecting, from the set of transforms, a transform configured to append user messages to the original instance of the at least one data file.

11. A computer program product for backing up electronically stored data files from a client device to a backup archive communicatively coupled to the client device, the computer program product comprising at least one computer-readable storage medium having program instructions embodied therewith, wherein the at least one computer readable storage medium is not a transitory signal per se, the program instructions executable by at least one computer hardware processor circuit to cause the at least one computer hardware processor circuit to perform a method comprising:
receiving a first request to back up a first set of data files from a client device to a backup archive;
copying, in response to the first request, with a client backup engine, to the backup archive, and recording, with a transform engine, a file transformation status of an original instance of an at least one data file from the first set of data files;
creating and recording the file transformation status of, with the transform engine in conjunction with a set of transforms and a transform map table, in the backup archive, an at least one transformed data file that includes a transformed instance of the at least one data file, by applying an at least one transform, selected from the set of transforms in accordance with the transform map table, to the original instance of the at least one data file;
receiving a second request to back up, from the client device to the backup archive, a second set of data files;
identifying, with a data file comparison program, in response to the second request, the at least one transformed data file with an instance in the backup archive that has a different file transformation status than an instance of the at least one transformed data file in the client device; and
sending, with the transform engine, in response to the identifying, the at least one transformed data file from the backup archive to the client device.

12. The computer program product of claim 11, wherein the original instance and the transformed instance of at least one data file from the first set of data files each include at least one data element, related to the at least one data file, representing a group of data items consisting of: data file transformation status, applied transforms, file metadata, data file version, messages to a system user, content enhancements, and reverse transform data.

13. The computer program product of claim 12, wherein the data element representing messages to a system user contains information indicating that at least one transformed data file has been sent from the backup archive to the client device.

14. An electronic system for backing up electronically stored data files from a client device to a backup archive communicatively coupled to the client device, the electronic system comprising:
a memory; and
at least one computer hardware processor in communication with the memory, wherein the at least one computer hardware processor is configured to obtain instructions from the memory that cause the at least one computer processor circuit to perform a method, the method comprising:
receiving a first request to back up a first set of data files from a client device to a backup archive;
copying, in response to the first request, with a client backup engine, to the backup archive, and recording, with a transform engine, a file transformation status of an original instance of an at least one data file from the first set of data files;
creating and recording the file transformation status of, with the transform engine in conjunction with a set of transforms and a transform map table, in the backup archive, an at least one transformed data file that includes a transformed instance of the at least one data file, by applying an at least one transform, selected from the set of transforms in accordance with the transform map table, to the original instance of the at least one data file;
receiving a second request to back up, from the client device to the backup archive, a second set of data files;
identifying, with a data file comparison program, in response to the second request, the at least one transformed data file with an instance in the backup archive that has a different file transformation status than an instance of the at least one transformed data file in the client device; and
sending, with the transform engine, in response to the identifying, the at least one transformed data file from the backup archive to the client device.

15. The electronic system of claim 14, wherein the method further comprises: maintaining, in the backup archive, the set of transforms by adding the at least one transform to the set of transforms and by adding data file and transform correspondence information to a transform map table.

16. The electronic system of claim 15, wherein the transform map table is used in a selection, from the set of transforms, of the at least one transform to apply to the original instance of the at least one data file.

17. The electronic system of claim 14, wherein the set of transforms includes at least one transform from a group consisting of: executable programs and data file filters.

18. The electronic system of claim 14, wherein the method further comprises: in conjunction with copying to the backup archive the original instance of at least one data file from the first set of data files, recording the file transformation status of the at least one data file to indicate that the first the original instance of at least one data file is backed up.

19. The electronic system of claim 14, wherein the method further comprises: in conjunction with creating in the backup archive at least one transformed data file that includes a transformed instance of the at least one data file, recording the data file transformation status of the at least one transformed data file to indicate that a transformed data file copy is ready.

\* \* \* \* \*